(12) United States Patent
Rozman et al.

(10) Patent No.: US 7,521,906 B2
(45) Date of Patent: Apr. 21, 2009

(54) GENERATING SYSTEM WITH A REGULATED PERMANENT MAGNET MACHINE

(75) Inventors: Gregory I. Rozman, Rockford, IL (US); Kevin Dooley, Mississauga (CA)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 11 days.

(21) Appl. No.: 11/825,583

(22) Filed: Jul. 6, 2007

(65) Prior Publication Data
US 2009/0009146 A1 Jan. 8, 2009

(51) Int. Cl.
*H20P 9/14* (2006.01)
*H20P 9/10* (2006.01)

(52) U.S. Cl. .............. 322/45; 322/24; 322/28; 322/56

(58) Field of Classification Search ............. 322/44, 322/45, 56, 28, 24
See application file for complete search history.

(56) References Cited

U.S. PATENT DOCUMENTS

| | | | |
|---|---|---|---|
| 7,372,174 B2 * | 5/2008 | Jones et al. | 290/44 |
| 7,408,327 B2 * | 8/2008 | Shah et al. | 322/46 |
| 7,423,411 B2 * | 9/2008 | Sihler | 322/19 |

OTHER PUBLICATIONS

U.S. Appl. No. 10/996,411, Kevin Dooley.
U.S. Appl. No. 11/420,614, Kevin Dooley.

* cited by examiner

*Primary Examiner*—Nicholas Ponomarenko
*Assistant Examiner*—Iraj A Mohandesi
(74) *Attorney, Agent, or Firm*—Stephen G. Mican

(57) ABSTRACT

An electromechanical power transfer system that transfers power between a prime mover and a direct current (DC) electrical power system, comprises: a permanent magnet machine (PMM) that has a permanent magnet (PM) rotor coupled to the prime mover, a stator with a multiphase alternating current (AC) winding coupled to an AC bus and a control coil with a winding that has a configuration to generate a magnetic field with flux that varies the reactance of the stator winding with the application of control coil current; a control coil current regulator system to regulate the control coil current; wherein the control coil current regulator system generates a level of the control coil current that regulates current in the stator to a desired level in response to a control coil current feedback loop that comprises a control coil current signal and a DC bus potential feedback loop that comprises a DC potential feedback signal and in a generating mode the main active rectifier system maintains a constant potential on the DC bus regardless of sudden changes in electrical load on the DC bus in response to the DC bus potential feedback loop and a rotor position feedback loop; and wherein both the control coil current regulator system and a main active rectifier system switch from an active regulating mode to a protection non-regulating mode upon detection of a fault in the DC bus.

12 Claims, 1 Drawing Sheet

GENERATING SYSTEM WITH A REGULATED PERMANENT MAGNET MACHINE

FIELD OF THE INVENTION

The invention relates to electric power generation systems, and more particularly to prime mover powered electric power generation systems capable of delivering direct current (DC).

BACKGROUND OF THE INVENTION

Electrical power generation systems powered by variable speed prime movers that require highly regulated electrical output, such as electrical power generation systems used for aeronautical applications, generally use a wound field synchronous machine (WFSM) that serves as an electrical generator. This is because it is easy to adjust rotor current to regulate electrical output of a WFSM. In aeronautical applications, the prime mover is often a gas turbine engine that has a normal rotational velocity that exceeds 20,000 revolutions per minute (rpm). Due to the rotational velocity limitations of the WFSM, such electrical power generation systems generally require a reduction gearbox between the prime mover and the WFSM. This increases weight, cost and complexity of the electrical power generation systems.

Electrical power generation systems may alternatively employ an electrical machine of the permanent magnet type as an electrical generator. Such a permanent magnet machine (PMM) is capable of much higher rotational velocity than a WFSM of similar output and therefore it is capable of direct coupling to the prime mover, thereby eliminating the reduction gearbox. This results in reduced weight, cost and complexity of an electrical power generation system. However, traditional PMMs have no convenient means to alter magnetic flux for regulating their output.

An electrical power generation system may alternatively use a regulated PMM that has a control coil. Current level in the control coil regulates output current of the PMM. A control coil current regulator system senses electrical output potential on a DC bus for the electrical power generation system and adjusts the current level in the control level to regulate the DC bus potential.

This system is very satisfactory except that because the DC bus supplies current to the control coil current regulator system, a separate circuit breaker is necessary to cut off the control coil current regulator system from the DC bus when the DC bus develops a fault such as a short circuit. The need for a separate circuit breaker to isolate the DC bus upon such an occurrence increases weight, size and cost of the electrical power generating system. There is also a need to for a separate circuit breaker to disconnect the DC bus from the faulty load.

SUMMARY OF THE INVENTION

The invention generally comprises an electromechanical power transfer system that transfers power between a prime mover and a direct current (DC) electrical power system, comprising: a permanent magnet machine (PMM) that has a permanent magnet (PM) rotor coupled to the prime mover, a stator with a multiphase alternating current (AC) winding coupled to an AC bus and a control coil with a winding that has a configuration to generate a magnetic field with flux that varies the reactance of the stator winding with the application of control coil current; a position sensing system for generating a rotor position signal that is representative of the angular position of the PM rotor; a control coil current sensor for generating a control coil current signal that is representative of the level of electrical current in the control coil; an electrical potential sensor for generating a DC bus potential signal that is representative of the level of DC potential on the DC bus; an electrical current sensor for generating a DC bus current signal that is representative of the level of DC current that the active rectifier supplies to the electrical load by way of the DC bus; an output power estimator that compares the DC bus potential signal with the DC bus current signal to generate an output power signal; a differentiator that receives the output power signal to generate a respective rate of output power signal; a summer that adds the rate of output power signal with the DC bus potential signal to generate a DC potential feedback signal; and a main active rectifier system for converting multiphase AC power developed by the stator to DC power supplied to the electrical load by way of a DC bus; a control coil current regulator system to regulate the control coil current; wherein the control coil current regulator system generates a level of the control coil current that regulates current in the stator to a desired level in response to a control coil current feedback loop that comprises the control coil current signal and a DC bus potential feedback loop that comprises the DC potential feedback signal and in a generating mode main active rectifier system maintains a constant potential on the DC bus regardless of sudden changes in electrical load on the DC bus in response to the DC bus potential feedback loop and the rotor position feedback loop; and wherein both the control coil current regulator system and the main active rectifier system switch from an active regulating mode to a protection non-regulating mode upon detection of a fault in the DC bus.

DETAILED DESCRIPTION OF THE INVENTION

Figure 1:
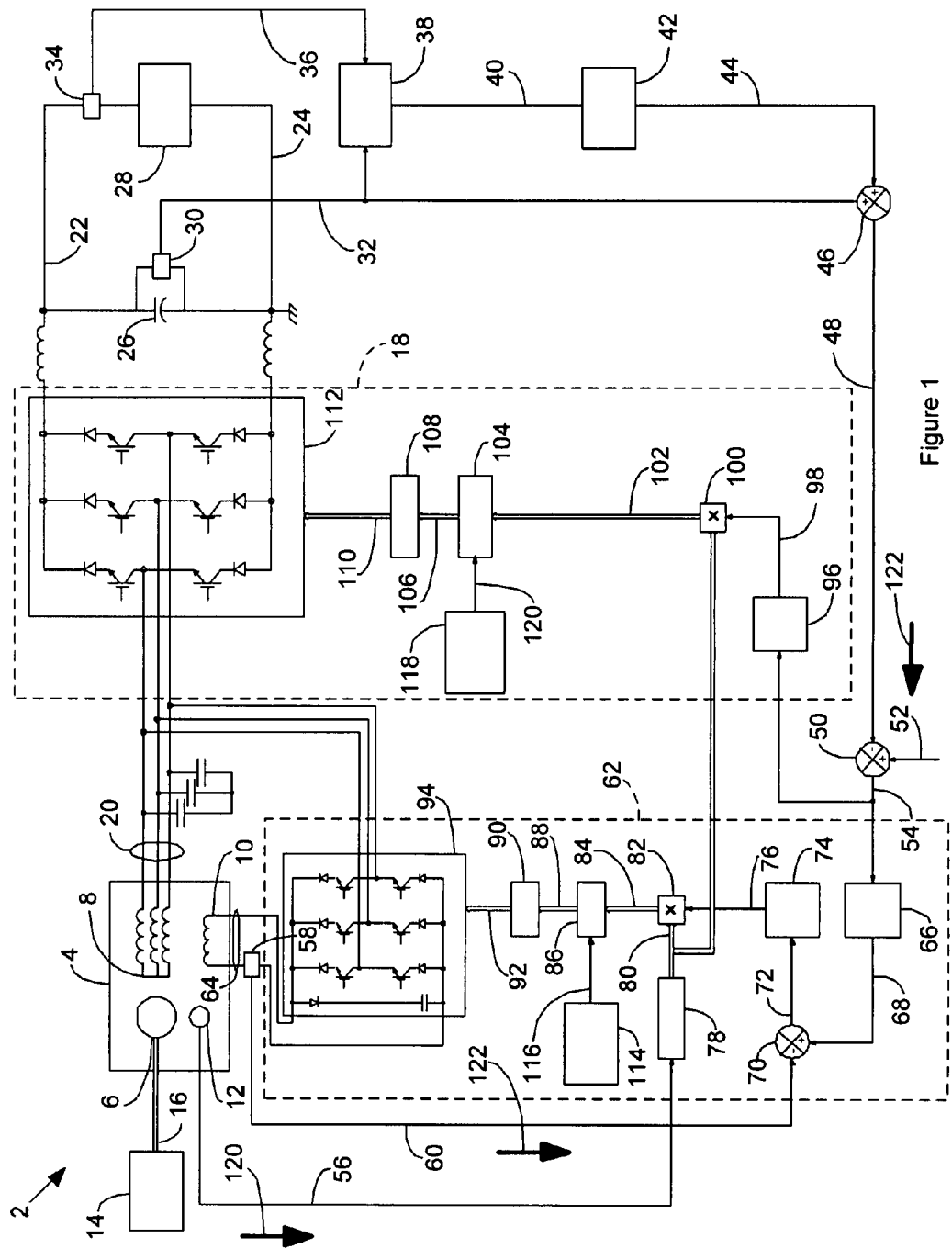
FIG. 1 is a high-level schematic diagram of an electrical power generation system according to a possible embodiment of the invention.

FIG. 1 is a high-level schematic diagram of an electrical power generation system 2 according to a possible embodiment of the invention. The electrical power generation system 2 comprises a PMM 4 that comprises a permanent magnet (PM) rotor 6, a stator 8, a magnetic control field generating control coil 10 and a position sensor 12. The rotor 6 comprises a permanent magnet type rotor. The stator 8 comprises a multiphase alternating current (AC) stator winding that is typically three phase AC. The control coil 10 comprises a winding in proximity to the stator winding 8 that is capable of generating a magnetic field with flux that passes through the stator winding 8 upon application of electrical current through the control coil 10. The position sensor 12 may be of any convenient type that is suitable for establishing the rotary position of the rotor 6.

PMM 4 may have any suitable construction. An example of a suitable construction is found in co-pending application Ser. Nos. 10/996,411 and 11/420,614, by Dooley, both incorporated herein by reference. With a PMM 4 of such construction, control coil 10 generates a magnetic field with flux that is capable of selectively saturating a portion of a magnetic circuit associated with a stator 8 upon application of electrical current through the control coil 10, thereby varying the reactance of the stator 8. The flux of the control coil field varies the reactance of the stator 8 over a very wide range, thereby permitting control of PMM output current rather than generated electromagnetic force (emf). This design also has an intrinsic magnetic feedback feature that causes the reactance of the PMM 4 to remain at a minimum value until the output current attains a specific ratio to the control current, at which point the reactance abruptly increases with output current. This makes the PMM 4 behave as a constant current source regardless of electrical load. The incorporated references describe further details of the construction and operation of such a PMM 4.

A prime mover 14, such as a gas turbine engine, drives the rotor 6 by way of a drive shaft 16. The rotating magnetic field that the rotor 6 generates develops multi-phase AC emf in the windings of the stator 8. A main active rectifier system 18 receives the AC emf from the windings of the stator 8 by way of an AC bus 20 and converts the AC electrical potentials on the AC bus 20 to a DC potential between a DC bus line 22 and a DC return line 24. Selectively driving gates in the main rectifier system 18 results in active rectifier operation. Driving all the gates simultaneously results in protection rectifier operation. A capacitor 26 between the DC bus line 22 and the DC return line 24 may reduce or eliminate any AC ripple and noise on the DC bus line 22 due to the rectifying action of the main rectifier system 18. An electrical load 28 passes DC current in response to the DC potential between the DC bus line 22 and the DC return line 24. An electrical DC potential sensor 30 senses DC potential across the DC bus line 22 and the DC return line 24 to produce a DC bus potential signal on a DC potential sensor output line 32 that is representative of the DC potential across the DC bus line 22 and the DC return line 24. An electrical DC current sensor 34 measures DC current that passes from the DC bus line 22 through the electrical load 28 to the DC return line 24 to produce a DC bus current signal on a DC current sensor output line 36 that is representative of the DC current that passes from the DC bus line 22 through the electrical load 28 to the DC return line 24.

An output power estimator 38 compares the DC bus potential signal on the DC potential sensor output line 32 with the DC bus current signal on the DC current sensor output line 36 to generate an output power signal on an output power estimator output line 40. A differentiator 42 receives the output power signal on an output power estimator output line 40 and generates a respective rate of output power signal on a differentiator output line 44. An output circuit summer 46 adds the rate of output power signal on the differentiator output line 44 with the DC bus potential signal on the DC potential sensor output line 32 to generate a DC potential feedback signal on an output circuit summer output line 48. An output circuit comparator 50 compares the DC potential feedback signal on the output circuit summer output line 48 with a DC potential reference signal on a DC potential reference line 52 and generates a DC potential error signal on an output circuit comparator output line 54 that is representative of the difference in these signals.

The position sensor 12 measures the angular position of the rotor 6 and produces a rotor position signal POS_FDBK on a position sensor output line 56 that is representative of the measured angular position. A control coil current sensor 58 measures the level of electrical current that passes through the control coil 10 and produces a control coil current signal ICC_FDBK on a control coil current sensor output line 60 that is representative of the level of control coil current that passes through the control coil 10.

A control coil current regulator system 62 supplies control coil current to the control coil 10 by way of a pair of control coil current supply lines 64 to regulate the current output of the PMM 4 regardless of changes in the value of the electrical load 28. The control current regulator system 62 adjusts the control coil current in response to the DC potential error signal on the output comparator output line 54, the rotor position signal on the position sensor output line 56 and the control coil current signal on the control coil current sensor output line 60.

The operation of the control coil current regulator system 62 is as follows. An output circuit proportional-integral (PI) controller 66 receives the DC potential error signal on the output circuit comparator output line 54 and generates a corresponding reference control coil current signal ICC_REF on an output circuit PI controller output signal line 68 that is representative of a desired value of control coil current to generate the desired value of back emf in the PMM 4.

A control coil current error comparator 70 compares the control coil current signal on the control coil current sensor output line 60 with the reference control coil current signal on the output circuit PI controller output signal line 68 to generate a control coil current error signal I_ERROR on a control coil current comparator output signal line 72 that is representative of the difference in these signals. A control coil current error PI controller 74 receives the control coil current error comparator output signal on the control coil current comparator output signal line 68 to generate a corresponding control coil current correction signal on a control coil current error PI controller output line 76.

A vector rotator module 78 receives the rotor position signal on the position sensor output line 56 and generates a plurality of vector rotation signals representing electrical phase of PMM output on a corresponding plurality of vector rotator module output lines 80. A control coil current circuit multiplier 82 receives the vector rotation signals on the vector rotator module output lines 80 and the control coil current correction signal on the control coil current error PI controller output line 76 to generate a plurality of control coil circuit drive signals on a corresponding plurality of control coil circuit multiplier output lines 84.

A control coil circuit pulse width modulation (PWM) modulator 86 receives the control coil current circuit drive signals on the control coil circuit multiplier output lines 80 and generates a plurality of control coil circuit PWM signals on a corresponding plurality of control coil circuit PWM modulator output lines 88. A control coil circuit gate drives module 90 receives the plurality of control coil circuit PWM signals on the control coil circuit PWM modulator output lines 88 and generates a plurality of control coil circuit gate drive signals on a corresponding plurality of control coil circuit gate drives module output lines 92.

A control coil current regulator 94 comprises an active rectifier circuit. It receives the AC emf from the windings of the stator 8 by way of the AC bus 20 and the plurality of control coil circuit gate drive signals on the control coil circuit gate drives module output lines 92 to convert power that it receives from the AC bus 20 to a DC control coil current through the control coil 10 by way of the control coil current supply lines 64. The control coil 10 thus generates a magnetic control field in the PMM 4 whose magnetic flux whose magnetic flux varies the reactance of the stator 8 over a very wide range, thereby permitting control of the output current of the PMM 4 rather than emf that it generates.

The operation of the main active rectifier system 18 is as follows. A non-linear function module 96 receives the DC potential error signal on the output circuit comparator output line 50 to generate a non-linear DC potential error signal on a non-linear module output line 98. A main rectifier multiplier 100 receives the vector rotation signals on the vector rotator module output lines 72 and the non-linear DC potential error signal on the non-linear module output line 94 to generate a plurality of main rectifier drive signals on a corresponding plurality of main rectifier multiplier output lines 102.

A main rectifier PWM modulator 104 receives the main rectifier drive signals on the main rectifier multiplier output lines 102 and generates a plurality of main rectifier PWM signals on a corresponding plurality of main rectifier PWM modulator output lines 106. A main rectifier gate drives module 108 receives the main rectifier circuit PWM signals on the main rectifier PWM modulator output lines 106 and generates a plurality of main rectifier gate drive signals on a corresponding plurality of main rectifier gate drives module output lines 110 to drive a main rectifier circuit 112 that comprises an active rectifier circuit. The main rectifier system 18 thus changes its angle of operation in response to sensed DC potential on the DC bus line 22 and the position signal on the position sensor output line 52 to regulate the DC potential that the active rectifier 18 produces on the DC bus line 22.

Upon sensing a fault in the DC bus line 22, such as a short circuit, a control coil protection mode module 114 within the control coil current regulator system 58 generates a control coil protection mode enable signal on a control coil protection mode module output line 116. The control coil circuit PWM modulator 86 receives the control coil protection mode enable signal on the control coil protection mode module output line 116 and generates control coil circuit PWM signals on the control coil circuit PWM modulator output lines 88 that force the control coil current regulator system 62 to operate in a protection non-regulating mode. At the same time, a main rectifier protection mode module 118 within the main rectifier system 18 generates a main rectifier protection mode enable signal on a main rectifier protection mode module output line 120. The main rectifier PWM modulator 104 receives the main rectifier protection mode enable signal on the main rectifier protection mode module output line 120 and generates main rectifier PWM signals on the main rectifier PWM modulator output lines 106 that forces the main rectifier system 18 to operate in a protection non-regulating mode.

In summary the control coil current regulator system 62 regulates the output current of the PMM 4 by controlling current that the control coil 10 receives by way of a control coil current feedback loop 122 that comprises the control coil current signal on the control coil current sensor output line 60, an electrical DC bus potential feedback loop 124 comprising the DC potential feedback signal on the DC current sensor output line 36 and a position feedback loop 126 comprising the rotor position signal on the position sensor output line 56. The main rectifier system 18 eliminates transients on the DC bus line 22 due to sudden changes in the value of the electrical load 28 by way of the electrical DC bus potential feedback loop 124 and the position feedback loop 126. Upon sensing a fault in the DC bus line 22, the control coil current regulator system 62 and the main rectifier system 18 switch from an active regulating mode to a protection non-regulating mode to prevent the electrical power generating system 2 from trying to compensate for the fault in the DC bus line 22.

The described embodiments of the invention are only some illustrative implementations of the invention wherein changes and substitutions of the various parts and arrangement thereof are within the scope of the invention as set forth in the attached claims.

The claimed invention is:

1. An electromechanical power transfer system that transfers power between a prime mover and a direct current (DC) electrical power system, comprising:
   a permanent magnet machine (PMM) that has a permanent magnet (PM) rotor coupled to the prime mover, a stator with a multiphase alternating current (AC) winding coupled to an AC bus and a control coil with a winding that has a configuration to generate a magnetic field with flux that varies the reactance of the stator winding with the application of control coil current;
   a position sensing system for generating a rotor position signal that is representative of the angular position of the PM rotor;
   a control coil current sensor for generating a control coil current signal that is representative of the level of electrical current in the control coil;
   an electrical potential sensor for generating a DC bus potential signal that is representative of the level of DC potential on the DC bus;
   an electrical current sensor for generating a DC bus current signal that is representative of the level of DC current that the active rectifier supplies to the electrical load by way of the DC bus;
   an output power estimator that compares the DC bus potential signal with the DC bus current signal to generate an output power signal;
   a differentiator that receives the output power signal to generate a respective rate of output power signal;
   a summer that adds the rate of output power signal with the DC bus potential signal to generate a DC potential feedback signal;
   a main active rectifier system for converting multiphase AC power developed by the stator to DC power supplied to the electrical load by way of a DC bus; and
   a control coil current regulator system to regulate the control coil current;
   wherein the control coil current regulator system generates a level of the control coil current that regulates current in the stator to a desired level in response to a control coil current feedback loop that comprises the control coil current signal and a DC bus potential feedback loop that comprises the DC potential feedback signal and in a generating mode the main active rectifier and inverter system maintains a constant potential on the DC bus regardless of sudden changes in electrical load on the DC bus in response to the DC bus potential feedback loop and the rotor position feedback loop; and
   wherein both the control coil current regulator system and the main active rectifier system switch from an active regulating mode to a protection non-regulating mode upon detection of a fault in the DC bus.

2. The power transfer system of claim 1, further comprising:
   an output circuit comparator that compares the DC potential feedback signal with a DC potential reference signal and generates a DC potential error signal that is representative of the difference in these signals;
   wherein the DC bus potential feedback loop further comprises the DC potential error signal.

3. The power transfer system of claim 2, wherein the control coil current regulator system comprises:
   an output circuit proportional-integral (PI) controller that receives the DC potential error signal and generates a corresponding reference control coil current signal that is representative of a desired value of control coil current to generate the desired value of back emf in the PMM;
   a control coil current error comparator that compares the control coil current signal with the reference control coil current signal and generates a control coil current error signal representative of the difference between the control coil current signal and the reference control coil current signal;

a control coil current error PI controller that receives the control coil current error signal and generates a corresponding control coil current correction signal;

a vector rotator module that receives the rotor position signal and generates a plurality of vector rotation signals;

a control coil current circuit multiplier that receives the vector rotation signals and the control coil current correction signal to generate a plurality of control coil circuit drive signals;

a control coil circuit pulse width modulation (PWM) modulator that receives the control coil current circuit drive signals and generates a plurality of control coil circuit PWM signals;

a control coil current regulator comprising an active rectifier for converting multiphase AC power developed by the stator to DC for the control coil that has a level corresponding to the control coil circuit PWM signals; and a control coil protection mode module that generates a control coil passive mode enable signal upon detection of a fault in the DC bus;

wherein the control coil circuit PWM modulator receives the control coil protection mode enable signal and generates control coil circuit PWM signals that force the control coil current regulator to operate in a protection mode.

4. The power transfer system of claim 2, wherein the active rectifier system comprises:

a vector rotator module that receives the rotor position signal and generates a plurality of vector rotation signals;

a non-linear function module that receives the DC potential error signal to generate a non-linear DC potential error signal;

a main rectifier multiplier that receives the vector rotation signals and the non-linear DC potential error signal to generate a plurality of main rectifier drive signals;

a main rectifier PWM modulator that receives the main rectifier drive signals on the main rectifier multiplier output lines and generates a plurality of main rectifier PWM signals;

a main rectifier comprising an active rectifier for converting multiphase AC power developed by the stator to DC for the DC bus that has a level corresponding to the control coil circuit PWM signals; and a main rectifier protection mode module that generates a main rectifier protection mode enable signal;

wherein the main rectifier PWM modulator receives the main rectifier protection mode enable signal and generates main rectifier PWM signals that force the main rectifier to operate in a protection mode.

5. The power transfer system of claim 1, wherein the flux of the control coil magnetic field may selectively saturate a portion of a magnetic circuit associated with the stator to vary the reactance of the stator.

6. The power transfer system of claim 5, wherein the control coil field flux varies the reactance of the stator to control output current of the PMM through the AC bus.

7. A generating system that converts mechanical power from a prime mover to direct current (DC) electrical power for an electrical load, comprising:

a permanent magnet machine (PMM) that has a permanent magnet (PM) rotor coupled to the prime mover, a stator with a multiphase alternating current (AC) winding coupled to an AC bus and a control coil with a winding that has a configuration to generate a magnetic field with flux that varies the reactance of the stator winding with the application of control coil current;

a position sensing system for generating a rotor position signal that is representative of the angular position of the PM rotor;

a control coil current sensor for generating a control coil current signal that is representative of the level of electrical current in the control coil;

an electrical potential sensor for generating a DC bus potential signal that is representative of the level of DC potential on the DC bus;

an electrical current sensor for generating a DC bus current signal that is representative of the level of DC current that the active rectifier supplies to the electrical load by way of the DC bus;

an output power estimator that compares the DC bus potential signal with the DC bus current signal to generate an output power signal;

a differentiator that receives the output power signal to generate a respective rate of output power signal;

a summer that adds the rate of output power signal with the DC bus potential signal to generate a DC potential feedback signal; and an active rectifier system for converting multiphase AC power developed by the stator to DC power supplied to the electrical load by way of a DC bus;

a control coil current regulator system to regulate the control coil current;

wherein the control coil current regulator system generates a level of the control coil current that regulates current in the stator to a desired level in response to a control coil current feedback loop that comprises the control coil current signal and a DC bus potential feedback loop that comprises the DC potential feedback signal and in a generating mode the active rectifier system maintains a constant potential on the DC bus regardless of sudden changes in electrical load on the DC bus in response to the DC bus potential feedback loop and the rotor position feedback loop; and wherein both the control coil current regulator system and the active rectifier and inverter system switch from an active regulating mode to a protection non-regulating mode upon detection of a fault in the DC bus.

8. The generating system of claim 7, further comprising:

an output circuit comparator that compares the DC potential feedback signal with a DC potential reference signal and generates a DC potential error signal that is representative of the difference in these signals;

wherein the DC bus potential feedback loop further comprises the DC potential error signal.

9. The generating system of claim 8, wherein the control coil current regulator system comprises:

an output circuit proportional-integral (PI) controller that receives the DC potential error signal and generates a corresponding reference control coil current signal that is representative of a desired value of control coil current to generate the desired value of back emf in the PMM;

a control coil current error comparator that compares the control coil current signal with the reference control coil current signal and generates a control coil current error signal representative of the difference between the control coil current signal and the reference control coil current signal;

a control coil current error PI controller that receives the control coil current error signal and generates a corresponding control coil current correction signal;

a vector rotator module that receives the rotor position signal and generates a plurality of vector rotation signals;

a control coil current circuit multiplier that receives the vector rotation signals and the control coil current correction signal to generate a plurality of control coil circuit drive signals;

a control coil circuit pulse width modulation (PWM) modulator that receives the control coil current circuit drive signals and generates a plurality of control coil circuit PWM signals;

a control coil current regulator comprising an active rectifier for converting multiphase AC power developed by the stator to DC for the control coil that has a level corresponding to the control coil circuit PWM signals; and a control coil protection mode module that generates a control coil protection mode enable signal upon detection of a fault in the DC bus;

wherein the control coil circuit PWM modulator receives the control coil protection mode enable signal and generates control coil circuit PWM signals that force the control coil current regulator to operate in a protection mode.

10. The generating system of claim 8, wherein the main active rectifier and inverter system comprises:

a vector rotator module that receives the rotor position signal and generates a plurality of vector rotation signals;

a non-linear function module that receives the DC potential error signal to generate a non-linear DC potential error signal;

a main rectifier multiplier that receives the vector rotation signals and the non-linear DC potential error signal to generate a plurality of main rectifier drive signals;

a main rectifier PWM modulator that receives the main rectifier drive signals on the main rectifier multiplier output lines and generates a plurality of main rectifier PWM signals;

a main rectifier comprising an active rectifier for converting multiphase AC power developed by the stator to DC for the DC bus that has a level corresponding to the control coil circuit PWM signals; and a main rectifier protection mode module that generates a main rectifier protection mode enable signal;

wherein the main rectifier PWM modulator receives the main rectifier protection mode enable signal and generates main rectifier PWM signals that force the main rectifier to operate in a protection mode.

11. The generating system of claim 7, wherein the flux of the control coil magnetic field may selectively saturate a portion of a magnetic circuit associated with the stator to vary the reactance of the stator.

12. The generating system of claim 11, wherein the control coil field flux varies the reactance of the stator to control output current of the PMM through the AC bus.

* * * * *